(12) United States Patent
Argue et al.

(10) Patent No.: US 9,275,393 B2
(45) Date of Patent: Mar. 1, 2016

(54) RECIPE SUGGESTION SYSTEM AND METHOD

(71) Applicant: WAL-MART STORES, INC., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

(*) Notice: Subject to any disclaimer, the term of this patent is extended or adjusted under 35 U.S.C. 154(b) by 255 days.

(21) Appl. No.: 13/719,026

(22) Filed: Dec. 18, 2012

(65) Prior Publication Data

US 2014/0172894 A1 Jun. 19, 2014

(51) Int. Cl.
  *G06F 17/30* (2006.01)
  *G06Q 30/02* (2012.01)

(52) U.S. Cl.
  CPC .......... *G06Q 30/02* (2013.01); *G06F 17/30867* (2013.01)

(58) Field of Classification Search
  CPC .............. G06F 17/30867; G06Q 30/0201; G06Q 30/02
  USPC ............... 707/722, 758; 705/26.7, 26.8, 27.1
  See application file for complete search history.

(56) References Cited

U.S. PATENT DOCUMENTS

| | | | |
|---|---|---|---|
| 4,703,423 A * | 10/1987 | Bado | G06Q 10/02 705/1.1 |
| 4,996,642 A | 2/1991 | Hey | |
| 7,249,708 B2 | 7/2007 | McConnell | |
| 7,873,543 B2 | 1/2011 | Perrier | |
| 8,412,579 B2 | 4/2013 | Gonzalez | |
| 8,504,440 B1 * | 8/2013 | Kolawa | G06Q 30/00 705/26.7 |
| 9,053,483 B2 * | 6/2015 | Geisner | G06Q 30/00 600/300 |
| 2002/0152126 A1 | 10/2002 | Lieu | |
| 2005/0144066 A1 * | 6/2005 | Cope | G06Q 30/02 705/14.25 |
| 2007/0141540 A1 * | 6/2007 | Borg | G06Q 30/02 431/127 |
| 2010/0153209 A1 * | 6/2010 | de Rubertis | G06F 17/30056 705/14.51 |
| 2010/0292998 A1 | 11/2010 | Bodlaender | |
| 2011/0145051 A1 | 6/2011 | Paradise | |
| 2011/0145093 A1 | 6/2011 | Paradise | |
| 2012/0078718 A1 | 3/2012 | Oka | |
| 2013/0085345 A1 * | 4/2013 | Geisner | G06Q 30/00 600/300 |
| 2013/0290068 A1 * | 10/2013 | Sobecks | G07F 9/02 705/7.29 |
| 2014/0095479 A1 * | 4/2014 | Chang | G06F 17/30699 707/722 |

* cited by examiner

*Primary Examiner* — Phong Nguyen
(74) *Attorney, Agent, or Firm* — Howard & Howard Attorneys PLLC (57) ABSTRACT

A computer-implemented method is disclosed herein. The method includes the step of storing, in a consumer purchase history database, identities of items purchased by a consumer. The method also includes the step of receiving, with a processing device of a recipe suggestion server, a recipe request signal from the consumer after said storing step. The method also includes the step of maintaining, in a recipe database, a plurality of recipes wherein each recipe is defined by a plurality of ingredients. The method also includes the step of comparing, with the processing device, the identities of items purchased by the consumer with the respective plurality of ingredients associated with one or more of the plurality of recipes. The method also includes the step of transmitting, with the processing device, at least one of the plurality of recipes to the consumer wherein the plurality of ingredients of the at least one of the plurality of recipes is correlated with the identities of items purchased by the consumer.

20 Claims, 5 Drawing Sheets

RECIPE SUGGESTION SYSTEM AND METHOD

BACKGROUND INFORMATION

1. Field of the Disclosure

The present invention relates generally to a system and method for suggesting one or more recipes to a consumer based on previous purchases by the consumer.

2. Background

The cost of feeding a family tends to increase over time. Generally, buying groceries and preparing meals at home can be less expensive than eating at a restaurant. However, in many families, all of the adults are employed outside the home. It can be desirable for the adults to spend available free time interacting with other family members such as children rather than cooking, so relatively little time can be spent developing cooking skills. Also, when the results of cooking tend to be disappointing, the adult attempting to cook for the family can become discouraged and expend even less effort when cooking future meals. In short, consistently cooking meals that are enjoyable and doing so efficiently can be challenging.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present disclosure. It will be apparent, however, to one having ordinary skill in the art that the specific detail need not be employed to practice the present disclosure. In other instances, well-known materials or methods have not been described in detail in order to avoid obscuring the present disclosure.

Reference throughout this specification to "one embodiment", "an embodiment", "one example" or "an example" means that a particular feature, structure or characteristic described in connection with the embodiment or example is included in at least one embodiment of the present disclosure. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

Figure 1:
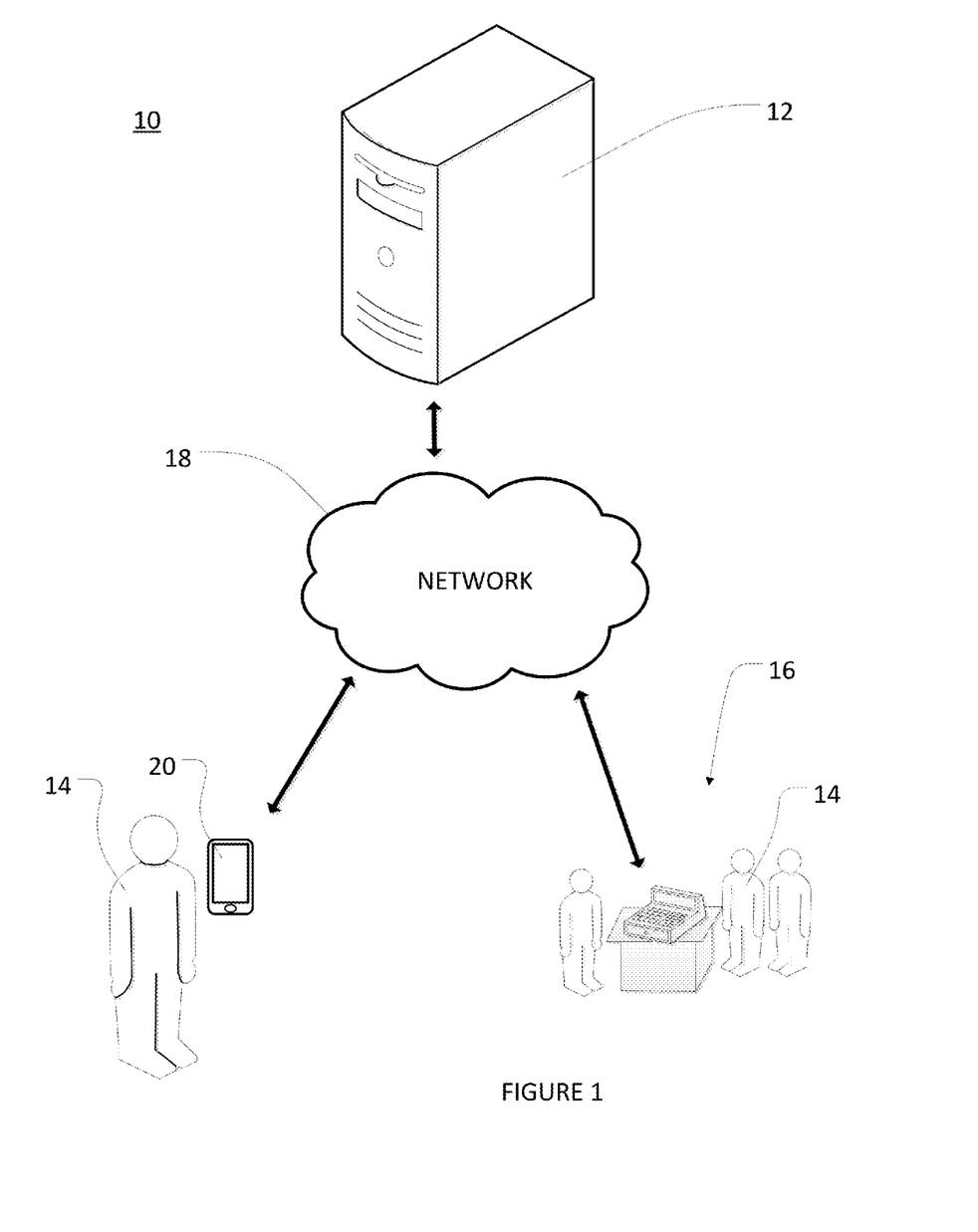
FIG. 1 is an example schematic illustrating a system according to some embodiments of the present disclosure.

FIG. 1 is a schematic illustrating a recipe suggestion system 10 according to some embodiments of the present disclosure. The recipe suggestion system 10 can implement a computer-implemented method that includes the step of storing, in a consumer purchase history database, the identities of items purchased by a consumer. The consumer purchase history database can be a component of a recipe suggestion server 12. The identities of items purchased by a consumer 14 can be transmitted to the recipe suggestion server 12 when the consumer 14 purchases the items at a checkout station 16 of a retail store. In some embodiments of the present disclosure, the consumer 14 can be permitted to add items to the consumer purchase history database if the items are not added automatically.

The identities of items purchased by a consumer 14 can be transmitted through a network 18. As used herein, the term "network" can include, but is not limited to, a Local Area Network (LAN), a Metropolitan Area Network (MAN), a Wide Area Network (WAN), the Internet, or combinations thereof. Embodiments of the present disclosure can be practiced with a wireless network, a hard-wired network, or any combination thereof.

After the identities of items purchased by the consumer 14 are stored in the consumer purchase history database, the recipe suggestion server 12 can receive a recipe request signal from the consumer 14. The recipe suggestion server 12 can allow the consumer 14 to establish an account. The consumer 14 can log into his/her account and request a recipe. The recipe suggestion server 12 can simplify meal preparation for the consumer 14 by quickly providing a recipe that can made with ingredients that the consumer 14 has already purchased.

The recipe request signal can be generated with an electronic computing device 20. The consumer 14 can generate the recipe request signal with a laptop computer, a desktop computer, a smart-phone, a tablet, an e-reader, or any other electronic computing device operable to generate and transmit a recipe request signal. The recipe request signal can be transmitted to the recipe suggestion server 12 through the network 18.

A plurality of recipes can be maintained in a recipe database. The recipe database can be a component of the recipe suggestion server 12. Each recipe can be defined by a plurality of ingredients. The recipe database can include dietary information for each recipe, such as calories, salt content, and other data included on a nutrition facts label. The recipe database can also include an ethnicity of each of the plurality of recipes. For example, recipes can be designated as Mexican, Italian, Chinese, French, or any other ethnicity.

In response to a recipe request signal from the consumer 14, the recipe suggestion server 12 can compare the identities of items that have been purchased by the consumer with the respective plurality of ingredients associated with each of the plurality of recipes stored in the recipe database. The recipe suggestion server 12 can correlate items purchased by the consumer 14 with ingredient lists of recipes in the recipe database. The recipe suggestion server 12 can identify all recipes that are made with ingredients that the consumer 14 has previously purchased. Thus, the consumer 14 can avoid having to shop for ingredients before cooking in some embodiments of the present disclosure.

The ingredients possessed by the consumer can be consumed or can spoil before a particular recipe request is submitted. In some embodiments of the present disclosure, each purchased item in the consumer purchase history database can be correlated with a probability that the item is usable. Values for probability can be time dependent. For example, as the time period between the purchase of an item and the receipt of a recipe request increases, the probability that the item is still possessed by the consumer and unspoiled can decrease. The recipe suggestion server can apply known techniques for determining probability distribution functions using Poisson, Gaussian, or geometric distributions. In addition, the probability determinations can be bounded by known expiration dates. For example, a purchased piece of produce with a known expiration date can be stored in the consumer purchase history database with a probability distribution function. If a recipe request is received the day of the purchase, the probability that the piece of produce is usable can be one. If a recipe request is received two months after the purchase of the piece of produce, the probability that the piece of produce is usable can be zero.

Recipes that include ingredients already purchased by the consumer 14 can be transmitted to the consumer by the recipe suggestion server 12. The recipe suggestion server 12 can transmit all recipes that are found to have an ingredient list that is correlated with items that the consumer 14 already possesses. Alternatively, the recipe suggestion server 12 can transmit less than all of the recipes that are found to have an ingredient list that is correlated with items that the consumer 14 already possesses.

The consumer 14 can selectively supplement the search criteria that is applied by the recipe suggestion server 12 and thereby tend to reduce the number of recipes that match all of the search criteria. For example, the basic search criteria applied in searching the recipes in the recipe database can be items the consumer 14 has previously purchased. Additional criteria can be selected by the consumer 14 in some embodiments of the present disclosure, such as the type of recipe desired (breakfast, lunch, or dinner), dietary attributes of the recipe (low fat, low carbohydrate, or both), and/or the primary ingredient (beef, chicken, fish, or vegetarian). If no recipes are found based on the search criteria, the recipe suggestion server 12 can advise the consumer 14 that no recipes were found.

Figure 2:
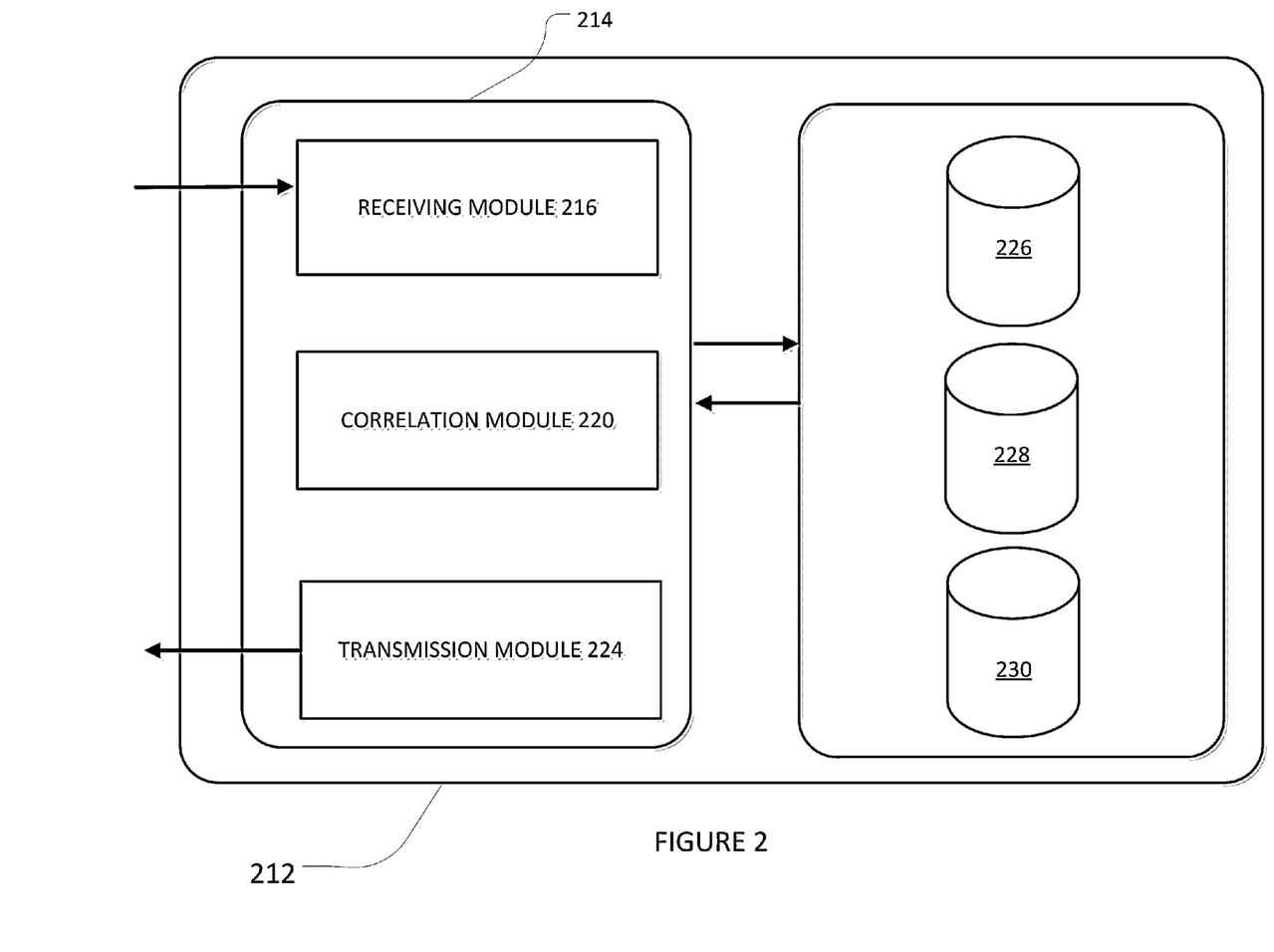
FIG. 2 is an example block diagram illustration of a recipe suggestion server that can be applied in some embodiments of the present disclosure.

FIG. 2 is a block diagram illustrating a recipe suggestion server 212 according to some embodiments of the present disclosure. In the illustrated embodiment, the recipe suggestion server 212 can include a processing device 214 having a receiving module 216, a correlation module 220, and a transmission module 224. The exemplary recipe suggestion server 212 can also include a consumer purchase history database 226, a recipe database 228, and a consumer preference database 230.

Any combination of one or more computer-usable or computer-readable media may be utilized in various embodiments of the disclosure. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages.

The consumer purchase history database 226 can include memory containing purchase histories of consumers, such as the items that have been purchased by the consumer. The stored data associated with each consumer can be limited to edible items, such as canned goods, spices, frozen foods, and any other edible item. Perishable items purchased by the consumer can be stored in the consumer purchase history database 226 for a predetermined period of time and then deleted. The predetermined period of time can be selected based on the nature of the perishable item. For example, meat items can be stored in the consumer purchase history database 226 for a period of time lasting days. Items like cheese or salad dressing can be stored for a period of time lasting weeks or months. The predetermined period of time can be selected based on the expiration date of the perishable item. The data in the consumer purchase history database 226 can be organized based on one or more tables that may utilize one or more algorithms and/or indexes.

The recipe database 228 can include memory containing recipes that can be transmitted to consumers in response to a recipe request signal. The recipe database 228 can include dietary information associated with each recipe. The dietary information can include fat content, grams of carbohydrates, and any other data that is set forth on a nutrition facts label. The recipe database 228 can also associate different cuisine categories with each recipe. For example, a recipe can be associated with a particular ethnicity category. A recipe can also be associated with a time of day category, such as breakfast, lunch, or dinner. A recipe can also be associated with a nature of the meal category, such as formal or casual. The recipes stored in the recipe database 228 and can be organized based on one or more tables that may utilize one or more algorithms and/or indexes.

The consumer preference database 230 can include memory containing meal preferences of the consumer. The consumer can input data to the recipe suggestion server 212 indicative of meal preferences. For example, upon the consumer establishing an account, the recipe suggestion server 212 can query the consumer regarding meal preferences. One exemplary meal preference can be the level of spiciness that the consumer enjoys. In addition, the consumer can submit reviews of meals that are prepared from recipes provided by the recipe suggestion server 212. If a recipe that is suggested by the recipe suggestion server 212 is not enjoyable, the consumer can communicate this outcome to the recipe suggestion server 212 and the recipe suggestion server 212 can supplement a profile of the consumer stored in the consumer preference database 230 to prevent the recipe from being communicated to the consumer again. The consumer meal preferences can be located within the consumer preference database 230 and can be organized based on one or more tables that may utilize one or more algorithms and/or indexes.

The processing device 214 can communicate with the databases 226, 228, 230. The processing device 214 can include computer readable memory storing computer readable instructions and one or more processors executing the computer readable instructions.

The receiving module 216 can be operable to receive transmissions over the network 18 and then communicate the transmissions to other components of the recipe suggestion server 212. The receiving module 216 can be configured to receive purchasing data associated with a consumer. The purchasing data can include items purchased by the consumer. The receiving module 216 can direct the purchasing data to the consumer purchase history database 226. The receiving module 216 can also receive input from a consumer regarding purchased items that were not automatically communicated to the recipe suggestion server 212 and direct this data to the consumer purchase history database 226.

The receiving module 216 can also be configured to receive a recipe request signal from the consumer. The recipe request signal can include additional search criteria that supplements primary search criteria; the primary search criteria can be ingredient lists that are correlated with the items that the consumer has previously purchased. The additional search criteria can reduce the results that are returned from the recipe search that is conducted by the recipe suggestion server 212. For example, the consumer can reduce the search results by requesting that only recipes having a "quick" preparation time be sent in response to the recipe request signal. The additional search criteria received by the receiving module 216 can be communicated to the correlation module 220.

The receiving module 216 can also be configured to receive data from the consumer. For example, the consumer can submit meal preferences to the consumer. The consumer can indicate that relatively spicy recipes are not preferred. The consumer can communicate that recipes producing a low quantity of carbohydrates are preferred. The consumer can report that a recipe previously received from the recipe suggestion server 212 was enjoyed and should be suggested again. These meal preferences received by the receiving module 216 can be communicated to the consumer preference database 230.

The correlation module 220 can be configured to correlate items that were previously purchased by the consumer with ingredient lists in the recipe database 228. The correlation module 220 can thus identify recipes for the consumer that can be prepared with items that the consumer already possesses. The correlation module 220 can also apply supplemental search criteria communicated by the consumer in the recipe request signal. The correlation module 220 can also apply data in the consumer preference database 230. The data in the consumer preference database 230 can define additional search criteria or can define exclusions to apply to search results. For example, a particular recipe might match all search criteria, but was previously sent and the consumer reported that the recipe was not enjoyed. Therefore, the recipe can be excluded from being suggested again to the consumer despite matching search criteria that is applied. Recipes that match all search criteria and are not excludable based on consumer preferences can be identified by the correlation module 220.

The transmission module 224 can be configured to transmit one or more recipes that are identified as matching all relevant criteria and not excludable by the correlation module 220. The transmission module 224 can be configured to transmit a single recipe, such as the recipe determined to best match the search criteria. In some embodiments, the transmission module 224 can be configured to transmit a single recipe when the recipe matches the search criteria, was previously suggested to the consumer, and was reported to be enjoyable by the consumer. Alternatively, the transmission module 224 can be configured to transmit all recipes that match the search criteria.

Figure 3:
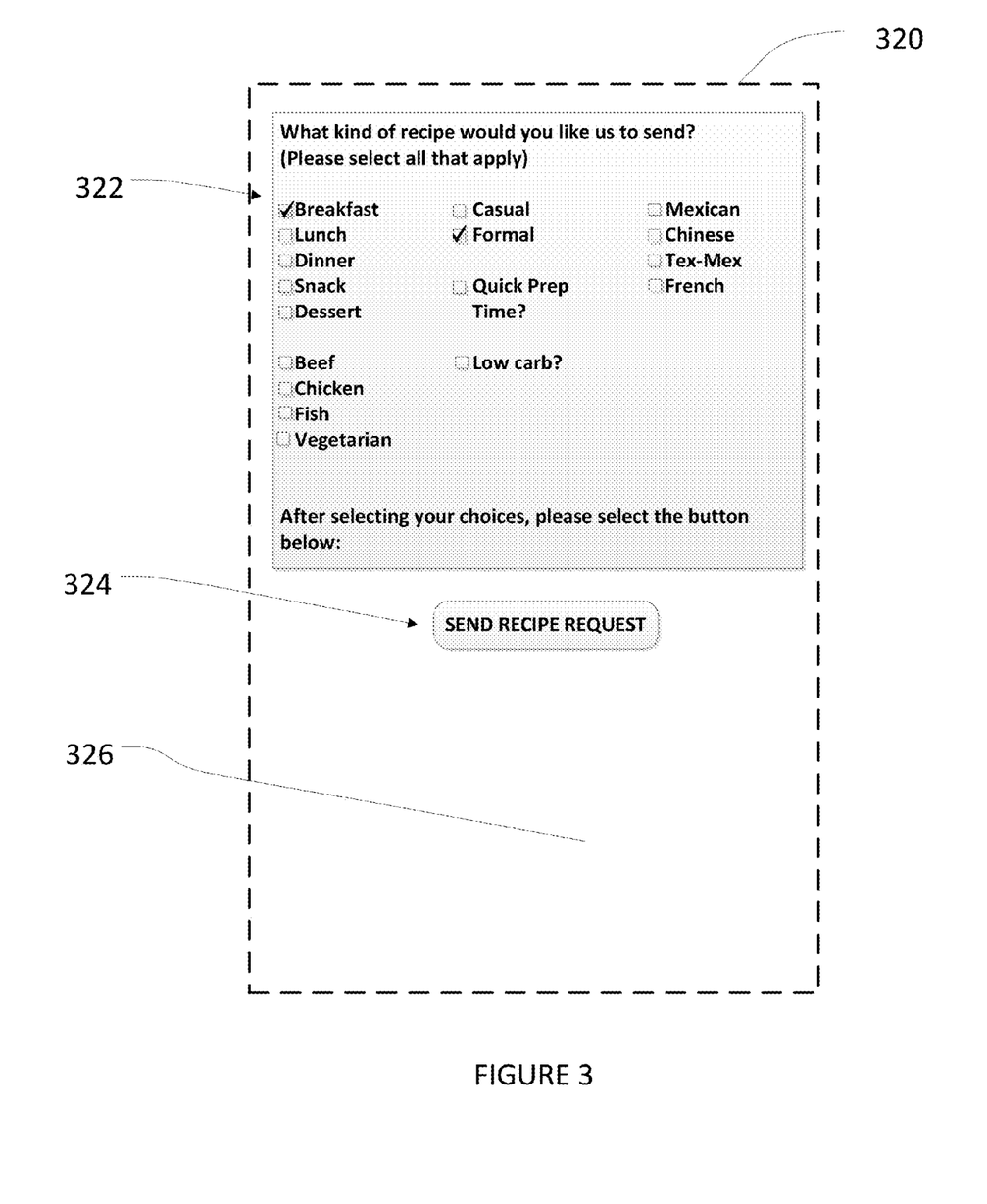
FIG. 3 is an example screen shot of the display visible on a consumer's electronic computing device in an embodiment of the present disclosure.

FIG. 3 illustrates a screen display that can be perceived by a consumer in some embodiments of the present disclosure. FIG. 3 is a screen display 320 of an electronic computing device of a consumer. FIG. 3 displays an input screen for submitting a recipe request in some embodiments of the present disclosure. A portion of the screen referenced at 322 can allow the consumer to supplement the search criteria that will be applied by the correlation module of the recipe request server when searching the recipe database. In the exemplary illustration, the consumer has indicated a desire for a recipe associated with breakfast and with a formal setting.

FIG. 3 also displays a button 324 that can be selected by the consumer after the supplemental search criteria has been selected. In some embodiments, a portion of the display, such as the portion referenced at 326 can be reserved for the display of product promotions. The portion 326 can also be reserved for displaying nutritional information.

Figure 4:
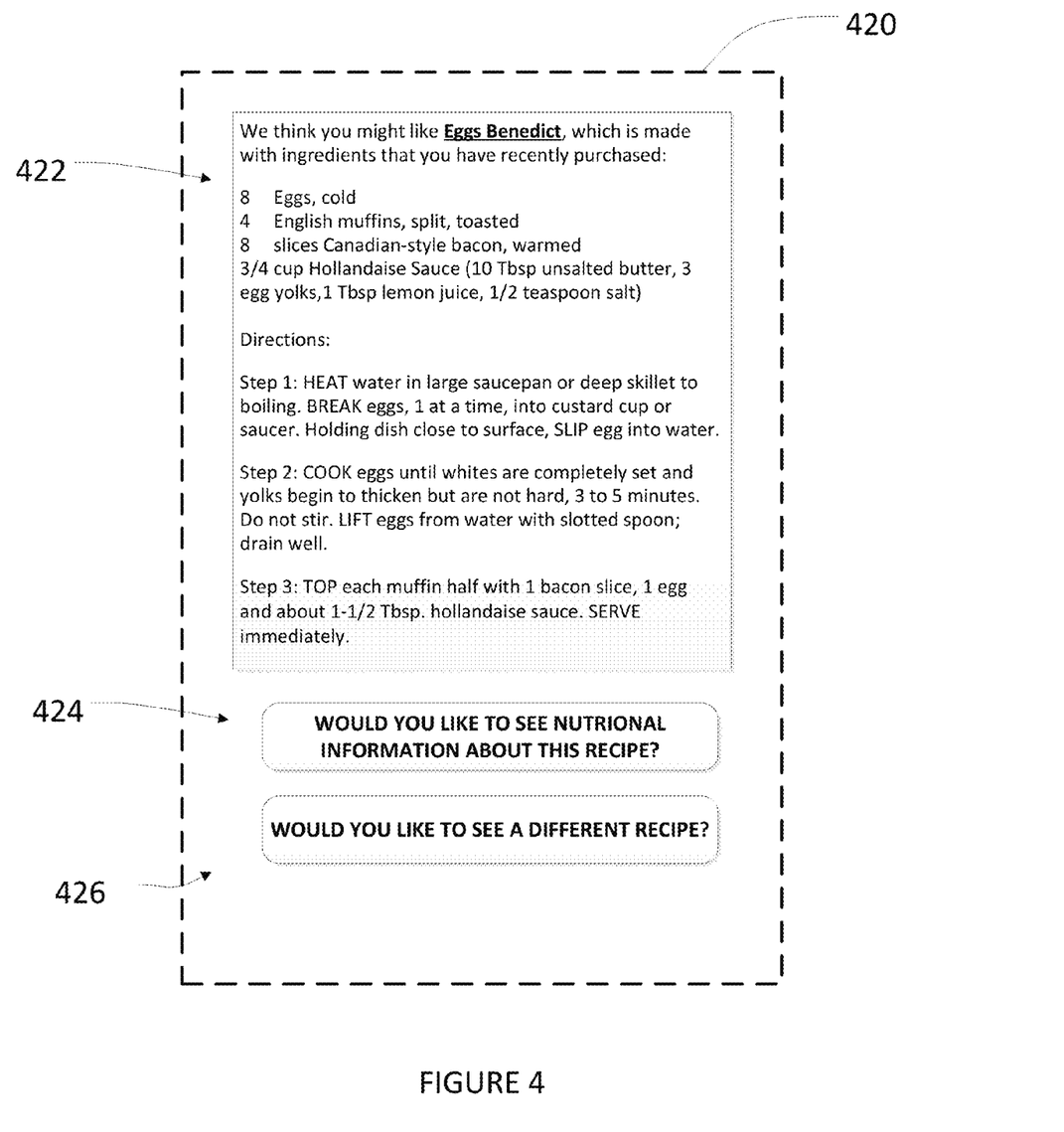
FIG. 4 is an example screen shot of the display visible on a consumer's electronic computing device in an embodiment of the present disclosure.

FIG. 4 illustrates a screen display that can be perceived by a consumer in some embodiments of the present disclosure. FIG. 4 is a screen display 420 of an electronic computing device of a consumer. FIG. 4 displays an output screen in response to a recipe request in some embodiments of the present disclosure. A portion of the screen referenced at 422 can display one or more recipes found by the correlation module with ingredients that match items purchased previously by the consumer, as well as any other search criteria dictated by the consumer.

In the exemplary embodiment, the correlation module has identified Eggs Benedict as a recipe matching the items that have been previously purchased by the consumer. The correlation module has also identified Eggs Benedict as a recipe that adheres to the supplemental search criteria dictated by the consumer, such that the recipe be associated with breakfast and with a formal setting.

In some embodiments, the consumer can be provided with nutritional information associated with a suggested recipe. In FIG. 4, a button 424 can be displayed. If selected the button 424 is selected by the consumer, nutritional information associated with the recipe offered in response to the recipe request signal can be displayed.

In some embodiments, the consumer can be provided with an option to select another recipe if the displayed recipe does not appear desirable. In FIG. 4, a button 426 can be displayed. If selected the button 426 is selected by the consumer, another recipe matching the search criteria can be displayed. If no additional recipes were found by the correlation module during the search, the recipe suggestion server can advise the consumer that no other recipes were found. Alternatively, if only one recipe is found, the button 426 can be omitted or replaced with a message to the consumer that no other recipes were found.

Figure 5:
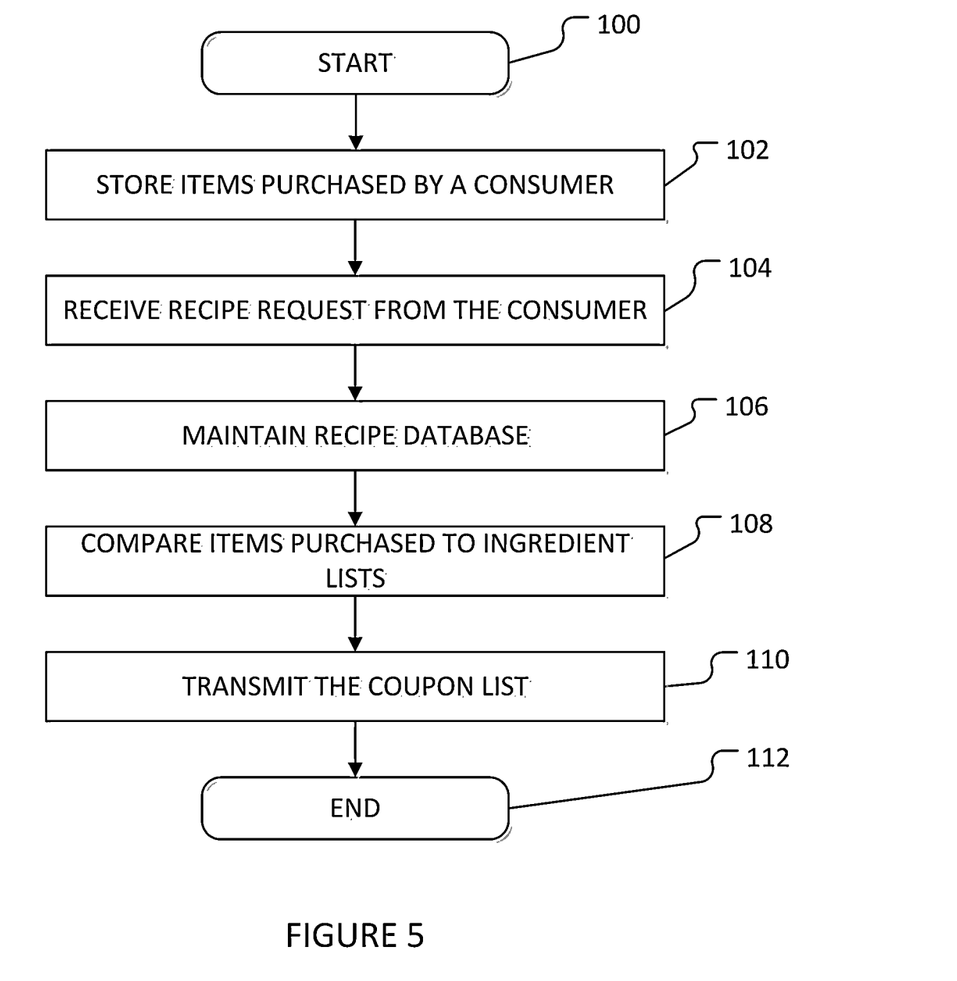
FIG. 5 is an example flow chart illustrating a method that can be carried out according to some embodiments of the present disclosure.

FIG. 5 is a flow chart illustrating a method that can be carried out in some embodiments of the present disclosure. The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The method starts at step 100. At step 102, the identities of items purchased by a consumer can be stored in a consumer purchase history database. The identities of the purchased items can be transmitted over a network. At step 104, a processing device of a recipe suggestion server can receive a recipe request signal from the consumer. The recipe request signal can be transmitted over the network.

At step 106, a plurality of recipes can be maintained in a recipe database. Each recipe can include a plurality of ingredients. At step 108, the processing device can compare the identities of items purchased by the consumer with the respective plurality of ingredients associated with one or more of the plurality of recipes stored in the recipe database. At step 110, the processing device can transmit at least one of the plurality of recipes to the consumer. The plurality of ingredients of any recipe transmitted to the consumer can be correlated with respect to the items that have been previously purchased by the consumer. The exemplary method ends at step 112.

The above description of illustrated examples of the present disclosure, including what is described in the Abstract, are not intended to be exhaustive or to be limitation to the precise forms disclosed. While specific embodiments of, and examples for, the present disclosure are described herein for illustrative purposes, various equivalent modifications are possible without departing from the broader spirit and scope of the present disclosure. Indeed, it is appreciated that the specific example voltages, currents, frequencies, power range values, times, etc., are provided for explanation purposes and that other values may also be employed in other embodiments and examples in accordance with the teachings of the present disclosure.

What is claimed is:

1. A computer-implemented method for suggesting a recipe to a consumer comprising the steps of:
   receiving identities of items being purchased by a consumer at a checkout station and storing the identities in a consumer purchase history database including identities of items previously purchased by the consumer, each of the identities of items including an associated purchase date;
   receiving, with a processing device of a recipe suggestion server, a recipe request signal from the consumer after said storing step;
   determining, for each of the identities of items stored in the consumer purchase database, a probability that the corresponding item is usable as a function of the purchase date associated with the corresponding item and a date associated with the received recipe request;
   maintaining, in a recipe database, a plurality of recipes wherein each recipe is defined by a plurality of ingredients;
   comparing, with the processing device, the identities of items purchased by the consumer with the respective plurality of ingredients associated with one or more of the plurality of recipes and selecting a set of recipes as a function of the identities of items purchased by the consumer and each associated probability that the corresponding item is usable;
   determining if one or more of the recipes included in the selected set of recipes has been previously rejected by the consumer and modifying the selected set of recipes to remove the rejected recipes;
   and
   transmitting, with the processing device, at least one of the recipes included in the modified selected set of recipes to the consumer wherein the plurality of ingredients of the at least one of the recipes included in the modified selected set of recipes is correlated with the identities of items previously purchased by the consumer.

2. The computer-implemented method of claim 1 wherein the consumer purchase history database is part of the recipe suggestion server.

3. The computer-implemented method of claim 1, wherein the recipe database is part of the recipe suggestion server.

4. The computer-implemented method of claim 1 wherein said maintaining step further comprises:
   maintaining, in the recipe database, dietary information associated with each of the plurality of recipes.

5. The computer-implemented method of claim 1 wherein said maintaining step further comprises:
   maintaining, in the recipe database, an ethnicity of each of the plurality of recipes.

6. The computer-implemented method of claim 1 wherein said transmitting step further comprises:
   transmitting, with the processing device, more than one of the recipes included in the modified selected set of recipes to the consumer wherein the plurality of ingredients of each of the plurality of recipes that are transmitted is correlated with the identities of items previously purchased by the consumer.

7. The method of claim 1 wherein said transmitting step further comprises:
   transmitting, with the processing device, dietary information associated with the at least one of the plurality of recipes.

8. The method of claim 1 further comprising:
   retaining, in a consumer preference database, meal preferences of the consumer.

9. The method of claim 8 further comprising:
   identifying, with the processing device and in response to said comparing step, more than one of the plurality of recipes wherein the plurality of ingredients of each of the more than one of the plurality of recipes is correlated with the identities of items previously purchased by the consumer.

10. The method of claim 9 further comprising:
    cross-referencing, with the processing device, the recipes identified in said identifying step with the meal preferences stored in the consumer preference database.

11. The method of claim 10 wherein said transmitting step further comprises:
    transmitting, with the processing device, only recipes are consistent with the meal preferences stored in the consumer preference database.

12. The method of claim 10 wherein said transmitting step further comprises:
    transmitting, with the processing device, recipes that are consistent with the meal preferences stored in the consumer preference database as well as recipes not previously transmitted to the consumer.

13. The method of claim 8 further comprising:
receiving, with the processing device, a consumer review of the at least one of the plurality of recipes transmitted to the consumer in said transmitting step; and
storing the consumer review as meal preference in the consumer preference database.

14. The method of claim 8 wherein said retaining step further comprises:
receiving, with the processing device, the meal preferences from the consumer.

15. A computing system comprising:
a consumer purchase history database containing identities of items previously purchased by a consumer;
a recipe database containing a plurality of recipes wherein each recipe is defined by a plurality of ingredients;
a computing device associated with a consumer; and
a server computer including:
a processing device including a processor coupled to a memory device, the processing device configured to:
receive identities of items being purchased by the consumer at a checkout station and storing the identities in the consumer purchase history database;
receive a recipe request signal from the computing device associated with the consumer;
determine, for each of the identities of items stored in the consumer purchase history database, a probability that the corresponding item is usable as a function of the purchase date associated with the corresponding item and a date associated with the received recipe request;
correlate the identities of items purchased by the consumer with the respective plurality of ingredients associated with one or more of the plurality of recipes and select a set of recipes as a function of the identities of items purchased by the consumer and each associated probability that the corresponding item is usable;
determine if one or more of the recipes included in the selected set of recipes has been previously rejected by the consumer and modify the selected set of recipes to remove the rejected recipes; and
a transmission module configured to transmit at least one of the recipes included in the modified selected set of recipes to the computing device to cause the computing device to display the at least one of the recipes to the consumer, wherein the plurality of ingredients of the at least one of the recipes included in the modified selected set is correlated with the identities of items previously purchased by the consumer.

16. The computing system of claim 15 further comprising:
a consumer preference database containing meal preferences of the consumer.

17. The computing system of claim 16 wherein said correlation module is configured to correlate meal preferences with any of the plurality of recipes having a plurality of ingredients correlated with the identities of items previously purchased by the consumer.

18. The computing system of claim 17 wherein said transmission module is operable to transmit all of the plurality of recipes having a plurality of ingredients correlated with the identities of items previously purchased by the consumer.

19. The computing system of claim 17 wherein said transmission module is operable to transmit all of the plurality of recipes that are defined by a plurality of ingredients correlated with the identities of items previously purchased by the consumer and that are consistent with meal preferences of the consumer.

20. The computing system of claim 17 wherein said transmission module is operable to transmit dietary information of the at least one of the plurality of recipes having a plurality of ingredients correlated with the identities of items previously purchased by the consumer.

* * * * *